Nov. 1, 1966    J. C. DANKO ET AL    3,281,921
SWAGING PROCESS FOR FORMING A FLATTENED
COMPOSITE THERMOELECTRIC MEMBER
Filed June 26, 1961    3 Sheets-Sheet 1
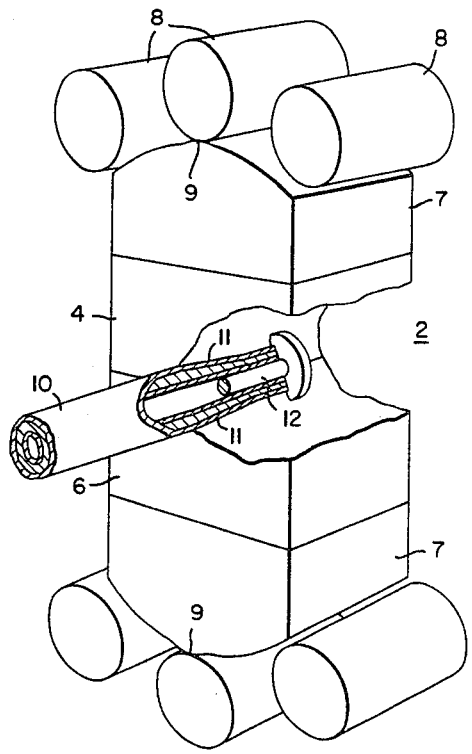
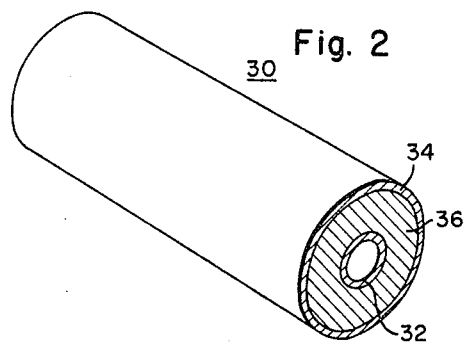
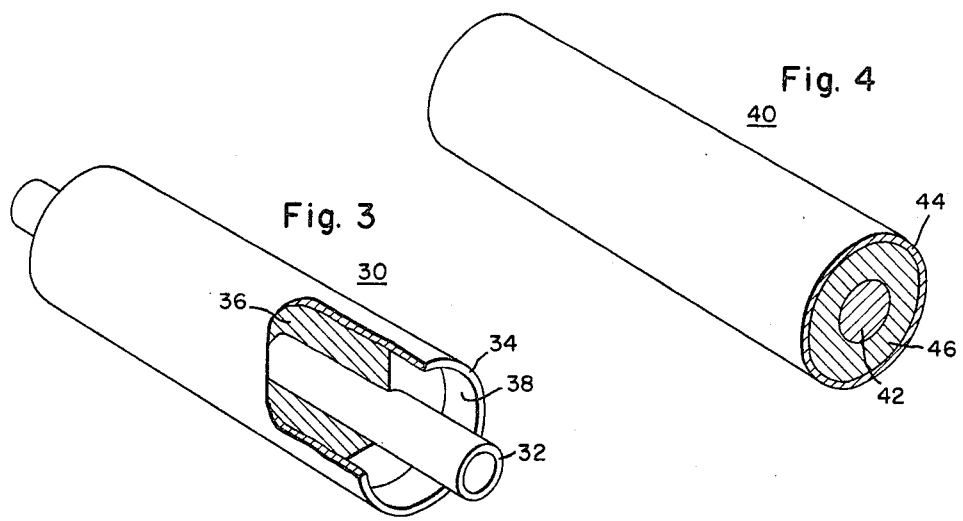
WITNESSES
John E. Heesley Jr.
Raymond H. Majesko
INVENTOR
Joseph C. Danko
BY
Frederick Stopes
ATTORNEY Nov. 1, 1966  J. C. DANKO ET AL  3,281,921
SWAGING PROCESS FOR FORMING A FLATTENED
COMPOSITE THERMOELECTRIC MEMBER
Filed June 26, 1961  3 Sheets-Sheet 2
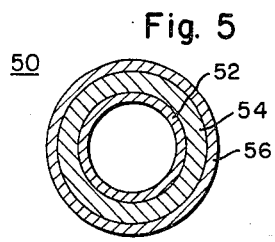
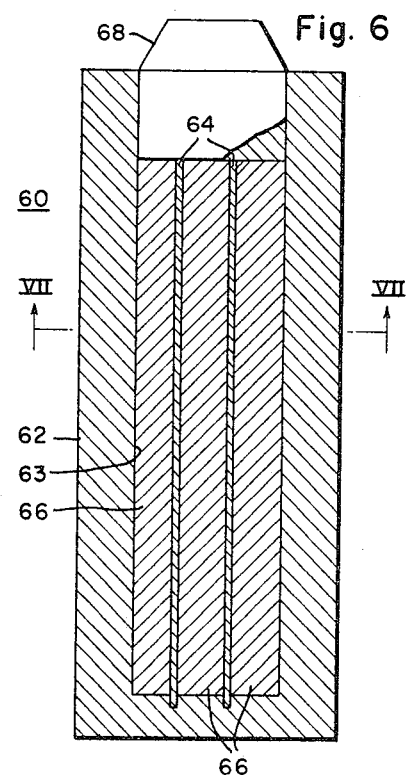
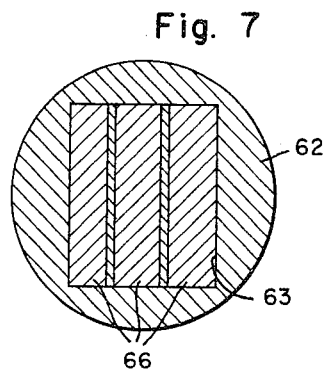
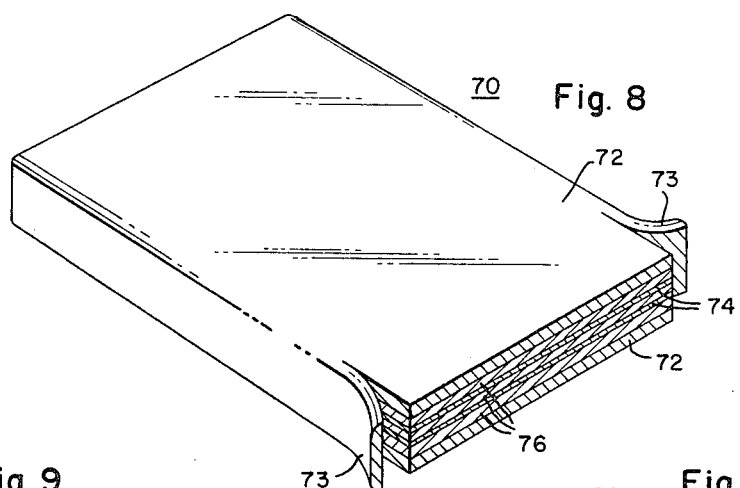
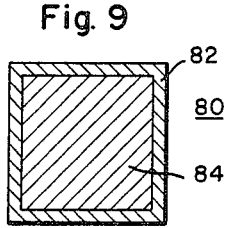
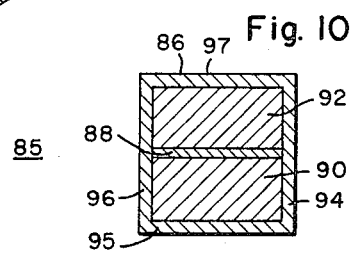

Nov. 1, 1966    J. C. DANKO ET AL    3,281,921
SWAGING PROCESS FOR FORMING A FLATTENED
COMPOSITE THERMOELECTRIC MEMBER
Filed June 26, 1961    3 Sheets-Sheet 3
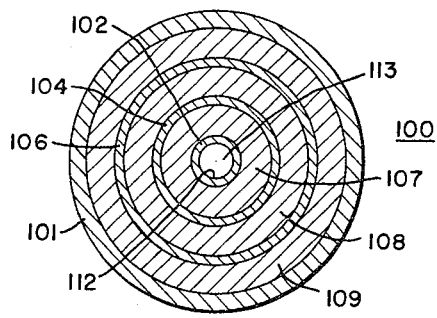
Fig. 12
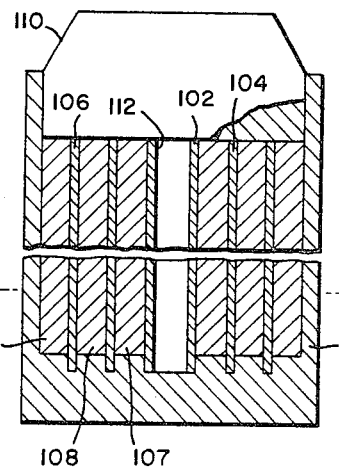
Fig. 11
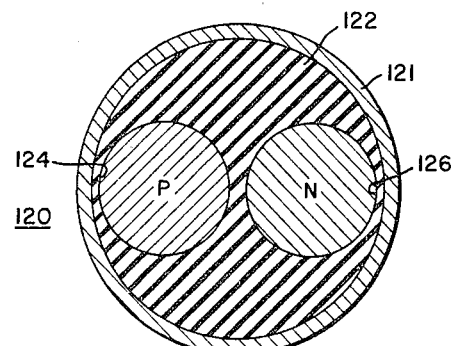
Fig. 13
Fig. 14
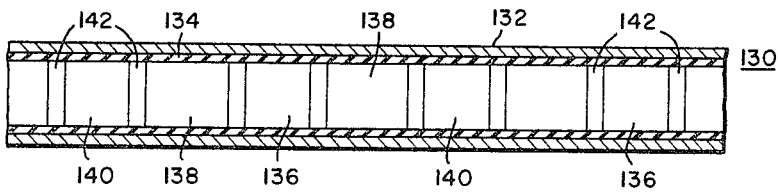
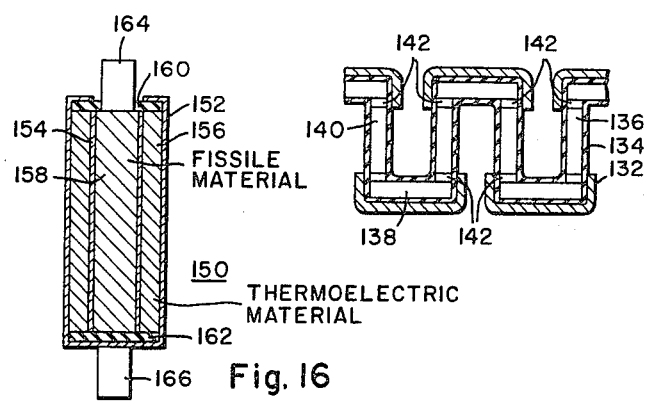
Fig. 15
Fig. 16

United States Patent Office 3,281,921
Patented Nov. 1, 1966

3,281,921
SWAGING PROCESS FOR FORMING A FLATTENED COMPOSITE THERMOELECTRIC MEMBER
Joseph C. Danko, Pitcairn, Pa., and Paul M. Bergstrom, Danville, Calif., assignors to Westinghouse Electric Corporation, East Pittsburgh, Pa., a corporation of Pennsylvania
Filed June 26, 1961, Ser. No. 119,654
2 Claims. (Cl. 29—155.5)

The present invention relates to a swaged composite, elongated cylindrical thermoelectric unit comprising a metallic sheath and highly compacted solids disposed and enclosed therein and processes involving swaging for producing the same.

There is a need for elongated composite members comprising an outer sheath or jacket of a metal joined to an enclosed body of a highly compacted solid which latter may be a ceramic, semiconductor material or the like. In particular, in producing thermoelectric devices, one of the most difficult problems is an application of good electrical contacts to a body of the thermoelectric material proper. The most efficient thermoelectric materials for both cooling and power generation applications are almost always comprised of semiconductor or ceramic-like materials. It is critically necessary that the electrical contacts which are metallic, be joined or bonded to the thermoelectric material almost perfectly so that the lowest possible electrical drop occurs therebetween. Also, the contact member must be so mechanically or physically joined that it will not loosen or become detached during service conditions when substantial temperature differences prevail in the devices. Those skilled in the art will appreciate the extreme difficulties in soldering, brazing or otherwise joining a metallic contact to a semiconductor or ceramic material, the latter often being brittle, to obtain these desired objectives. A high percentage of effective or unsatisfactory devices occur routinely even in the best processes now in use. During service many failures take place because of the gradual weakening or mechanical disruptions of the bond between the metallic contacts and the body of thermoelectric material.

It is particularly advantageous to employ the swaging process described herein to produce composite, elongated cylindrical units as compared to other methods, such as, extrusion in that there is flexibility in the selection of tube members, partition members and thermoelectric materials. It is difficult to extrude different metals, insulating materials and thermoelectric materials at the same temperature because of wide differences in ductility, elastic properties and space factor. For example, in order to extrude bismuth telluride disposed in a stainless steel tube, one necessarily must extrude above the melting point of the bismuth telluride. This problem would not arise when swaging since it may be performed at room temperature. Also, in extrusion, the length of the tube to be extruded is limited while this is not a material factor in swaging.

The object of the present invention is to provide a swaged unit comprising an inner cylindrical metal member and an outer hollow concentric cylindrical metal member disposed thereabout with a compacted thermoelectric material disposed in the space therebetween, the swaged thermoelectric material being highly consolidated and in firm and intimate contact with the walls of the metal members.

A further object of the present invention is to provide a swaged unit comprising an inner cylindrical metal member comprising a core of fissile material and an outer hollow concentric cylindrical metal member disposed thereabout with a compacted thermoelectric material disposed in the space therebetween, the swaged thermoelectric material being highly consolidated and in firm and intimate contact with the walls of the metal members.

Another object of the invention is to provide a process for concurrently consolidating a compatible thermoelectric material into a thermoelectric body and to provide well bonded metal contacts thereto by swaging a billet comprising a metal jacket and a thermoelectric material so as to produce an elongated thermoelectric element in which the metal jacket forms an electrical contact extremely well bonded to the highly consolidated body of thermoelectric material which would meet the requirement for optimum thermoelectric use.

Still another object of the invention is to provide a process for swaging a unit comprising a metal jacket, a compatible thermoelectric material disposed in the metal jacket and a central metal member so as to provide an elongated unit in which the swaged thermoelectric material is consolidated into a solid body and is well bonded to the exposed surfaces of the metal jacket and the central metal member.

A still further object of the invention is to provide a process for swaging a unit comprising a jacket, at least one thermoelectric material disposed in the metal jacket and a central metal member so as to produce an elongated thermoelectric element in which the swaged metal of the jacket forms one contact well bonded to one surface of a highly consolidated body of thermoelectric material and the central metal member forms another contact well bonded to another surface of the consolidated body of thermoelectric material.

Still another object of the invention is to provide a swaged unit comprising a metal jacket with alternate compacted bodies of different thermoelectric materials and metal contacts disposed therein, the materials being highly consolidated and in firm and intimate contact with the walls of the metal member.

Other objects of the invention will in part, be obvious and will, in part, appear hereinafter.

For a better understanding of the nature and scope of the invention, reference should be had to the following detailed description and drawings, in which:

FIGURE 1 is a perspective view partly in cross-section of a portion of a swaging apparatus;

FIG. 2 is a perspective view of a swaged thermoelectric element with a hollow center;

FIG. 3 is a perspective view partly in cross-section of the machined thermoelectric element of FIG. 2;

FIG. 4 is a perspective view of a swaged thermoelectric element with a solid center;

FIG. 5 is a cross-sectional view of a cylindrical metal member composed of dissimilar metals;

FIG. 6 is an elevational view in cross-section of a compartmented cylindrical metal member filled with thermoelectric material prior to swaging;

FIG. 7 is a plan view in cross-section of the metal member of FIG. 6 on lines VII—VII;

FIG. 8 is a perspective view partly in cross-section of the member of FIG. 7 after swaging;

FIG. 9 is a cross-sectional view of a swaged thermoelectric element of a square configuration;

FIG. 10 is a cross-sectional view of a compartmented swaged thermoelectric element of square configuration;

FIG. 11 is an elevational view partly in cross-section of a plurality of concentric cylindrical members with thermoelectric material disposed between the members prior to swaging;

FIG. 12 is a plan view in cross-section on lines XII—XII of the member of FIG. 11;

FIG. 13 is a cross-sectional view of a two compartment cylindrical metal member prior to swaging;

FIG. 14 is a cross-sectional view showing the arrangement of thermoelectric pellets in a metal sheath prior to swaging;

FIG. 15 is a cross-sectional view of a thermoelectric device produced from the swaged member of FIG. 14; and FIG. 16 is a cross-sectional view of a thermoelectric nuclear fuel element.

In accordance with the present invention and in attainment of the foregoing objects, a compactible thermoelectric material is consolidated into a body of desired shape with at least an outer metal jacket firmly joined thereto to produce a composite unit by (1) introducing the compactible thermoelectric material into a hollow cylindrical metal member having at least one compartment therein formed by the inner walls of the cylindrical member, at least one metal partition member may also be disposed within the cylindrical metal member (in a preferred form of the invention the partition member being a centrally disposed cylindrical member) sealing the ends of the cylindrical member so that the compactible material will be retained therein, and (2) compacting the same therein by swaging the unit comprising the sealed cylindrical member to effect a selected reduction in area of at least 1%, whereby to produce an elongated unit comprising a highly consolidated body of the compactible material with the swaged metal members joined in firm and intimate contact with the surfaces thereof.

In a further modification of the invention, the thermoelectric material is disposed between a metal sleeve and a central core of fissile material such as uranium, thorium or platinum, or compounds thereof such as uranium oxide or uranium carbide, and upon swaging the assembly, a thermoelectric nuclear fuel element is produced. The fuel element may be disposed in a nuclear core assembly with suitable electrical leads to the thermoelectric portion and with a cooling fluid circulating about the exterior of the element so that heat generated in the nuclear core will pass through the thermoelectric elements and generate an electrical current. The fissile material may be disposed in a hollow tube, for instance uranium oxide powder in a stainless steel or zircaloy tube, then a larger tube placed around it and the thermoelectric material introduced into the annular passage between the tubes, the tube ends are sealed and the assembly is swaged to consolidate the entire assembly.

The compactible materials employed herein may comprise metallic and non-metallic substances such as refractory metals, ceramics or semiconductors or mixtures of two or more. In a preferred embodiment of the invention, a compactible thermoelectric material is concurrently consolidated into a body of desired shape with metal contacts joined to the surfaces of the body to produce a thermoelectric element by the above described process. In this latter case, the thermoelectric material is introduced between two concentrically disposed cylindrical metal members. The member may be heat treated after swaging to insure good contact between the compacted material and the metal members. Then, the resulting elongated swaged member will be processed by removing the ends, and the member may be severed into a plurality of cylindrical units of any desired length which may be further machined, or the member may be severed into relatively small individual thermoelectric pellets of desired shape. The cylindrical units or pellets may be joined to other thermoelectric pellets to produce composite thermoelectric elements and assemblies which may be electrically connected, and suitably insulated, both electrically and thermally, into thermoelectric power generators or cooling devices.

It should be understood that both the compactible thermoelectric and fissionable material or materials may be either cast or molded within the hollow cylindrical metal member or may be disposed therein in the form of one or more prepressed compacts, or loosely as powder or flakes. In nearly all cases, it is desirable that as high a density of the material as in reasonably possible be secured when it is disposed in the hollow metal member.

For some applications, particularly for thermoelectric members, the unit should be evacuated to remove all gases from the compactible material being compacted.

Referring to FIGURE 1, there is shown a portion of rotary swager which is typical of that used to carry out the teachings of the invention. In operation, a forming die made up of segments 4 and 6, in multiples of two, is backed-up by an equal number of hammers 7, usually held in a revolving caging spindle, and driving means (not shown). As is illustrated in the drawings, the hammers 7 are actuated by means of rollers 8 as they contact a projection 9 on each hammer. The rotary movement of the spindle results in a striking force as the hammer and die segments pass between each of the rollers 8 and a swageable member 10. This causes a reshaping of the member 10 in conformance with the shape of the surface 11 of the die segments. Centrifugal force throws the die and hammer segments outwardly between blows once the projection 9 passes out of contact with a roller.

When swaging a hollow cylindrical metal member, a mandrel 12 is necessary to have the swaged member conform to the required inner diameter of the member so that the desired inner diameter may be present after swaging. Also, while only two dies are shown in the drawing, a total of four dies disposed at angles of 90° to each other may be employed.

Referring to FIGURE 2, there is shown a swaged thermoelectric element 30, after the ends of the element are removed, consisting of an inner hollow cylindrical metal contact member 32 and an outer concentric cylindrical metal contact member 34 with a body 36 of highly consolidated thermoelectric material disposed therebetween and joined in firm and intimate contact with the metal walls of the members 32 and 34. Surprisingly good bonding is effected between the metal and the body 30. The thermoelectric material body 36 may consist of any one of the P or N-type materials or two or more suitable layers in sequence.

The metals used in forming the members 32 and 34 are selected on the basis of their compatibility with the thermoelectric material, desired electrical and temperature characteristics and resistance to corrosive atmospheres for a given application.

When employing the swaged thermoelectric element 30 in an operational device, it is often desirable to connect two or more of either P or N-type or alternate PN-type elements in a particular type of arrangement and circuitry.

Referring to FIGURE 3 there is shown the element 30 with a portion of the thermoelectric material 36 machined out of the end space between metal contact members 32 and 34 to provide for introducing coupling means to join it to another element. The other end of the element 30 is similarly treated. Each end of the outer cylindrical contact member 34 may then be cut back so that at each end the inner cylindrical contact member 32 projects beyond it. Thereafter coupling means with electrical insulation may be soldered or brazed to either the member 32 or 34. The method of connecting the machined elements in a particular arrangement is the subject matter of copending application Serial No. 87,216, filed February 6, 1961 and now abandoned.

Referring to FIGURE 4 there is shown a modified swaged thermoelectric element 40 wherein the inner cylindrical metal member 42 is a solid rod. The element comprises a concentric cylindrical metal contact member 44 with consolidated thermoelectric material 46 disposed between the two metal members and in firm and intimate contact with the walls of the same. If desired, the rod 42 may be suitably machined as by boring or etching to provide a hollow center in the element 40.

The inner hollow contact member 32 not only serves to carry electrical current, but enables a cooling fluid such as water or air to be conveyed to dissipate heat if it comprises the hot junction of a refrigerating device. If the element 30 is employed as part of an electrical generator, hot gases, liquid or other heat source such as fissile material may be disposed in or passed through the hollow contact member 32. The outer contact member 34 may cool a space or it may dissipate heat to a cold sink in either of these cases. The functions of outer contact member 34 and the inner contact member 32 can be reversed.

Referring to FIGURE 5 there is shown a cylindrical metal member 50 having concentrically bonded layers of dissimilar metals which may be required for special applications. The exposed layers 52 and 56 may consist of stainless steel or zirconium or zirconium base alloys for highly corrosive atmospheres and the inner layer 54 may consist of a good electrically conductive metal, preferably copper or its alloys.

The cylindrical member 50 may be used as the inner cylindrical member 32 of the thermoelectric element 30 and thereby become the inner contact member thereof, or, it may be employed as the outer concentric cylindrical member 34 of thermoelectric element 30 to provide a corrosion resistant outer contact member thereof. The respective metal layers 52 and 56 are provided to prevent reaction between certain thermoelectric materials with the highly conductive metal during swaging and the other to prevent corrosion during operation of the thermoelectric device made therefrom. Good results have been obtained when the layers 52 and 56 each were of the order of 5 mils in thickness of stainless steel or zirconium base alloy known as zircaloy, whereas the layer 54 was comprised of copper and was of the order of 30 mils in thickness, both thicknesses being after swaging.

In certain cases, it is desired to produce by swaging flat surface or relatively flat faced, plate-like thermoelectric elements, particularly those comprising two or more thermoelectric materials in sequence.

In some instances, the different thermoelectric materials must be separated by a partition to prevent reaction between them during swaging or use. The principles involved here are the subject matter of copending application Serial No. 83,987, filed January 23, 1961 and now abandoned.

Referring to FIGURES 6 and 7, there is shown a compartmented member 60 suitable for preparing such thermoelectric plate elements. In this modification, a cylindrical outer metal casing 62 having a rectangular hollow space 63 is sub-divided into several compartments. The desired compartment width ratio is provided by metal partitions 64, suitably located in the hollow space 63 prior to swaging. The width of each compartment is designed for a certain thermal gradient which will be encountered by the final element in service. Thermoelectric materials 66 are placed in the member spaced 63 and usually will be of a different composition for each compartment in order to operate at maximum efficiency in the different temperature zones in service. The same or similar thermoelectric material can be used at different levels or types of doping, one doping level in each compartment. The partition 64 may be integral with the casing 62. Partitions of a different metal composition than casing 62 may, as plates, be fitted into grooves in the lower end of the casing 62 as shown in FIGURE 6. It should be observed that each thermoelectric material 66 in each compartment is isolated from the others.

After the thermoelectric materials are placed in the compartments and compressed, they are then out gassed and the open end of the casing 62 is sealed with a cap 68. The completed member 60 is swaged in the same manner indicated previously, except the swaging is effected through a die having a flat rectangular orifice. Similarly other shapes such as elliptical and hexagonal shapes may be produced.

With reference to FIGURE 8, there is shown a thermoelectric element 70 after swaging the member of FIGURE 7 and removal of the end thereof. The element 70 consists of outer metal cladding 72, partitions 74 and thermoelectric material layers 76 disposed between the metal partitions and metal cladding and joined in firm and intimate contact with the metal surface thereof. The opposite edges 73 of the metal cladding 72 may then be removed by sawing or machining so that the layers of the thermoelectric material and the partitions are exposed on all sides. It should be understood that the thermoelectric materials 76 are arranged so that one flat base of the resulting element 70 can function as a hot junction and the other flat face a cold junction with maximum efficiency. The element 70 may then be severed laterally or diced into a plurality of elements or it may be employed as a single unit.

Similarly a thermoelectric element of initially a square or rectangular cross-section may be swaged. With reference to FIGURES 9 and 10, a thermoelectric element 80 comprising a cylindrical metal member 82 of square configuration and a thermoelectric material 84 disposed therein, is shown. The element is swaged through a die having a square orifice. The element 80 may be diced to provide a considerable number of thermoelectric pellets.

With reference to FIGURE 10, there is shown a swaged compartmented thermoelectric element 85 comprising a cylindrical metal member 86 of a square configuration and a partition member 88 which may be either a metal or an insulator. The thermoelectric materials 90 and 92 disposed in the compartments may be of a different composition, for example, a P-type material in one compartment and an N-type material in the other compartment. The element 85 results from being swaged through a die having a square orifice and following the swaging the sides of the outer metal claddings 94 and 96 may be removed leaving the upper and lower metal faces 95 and 97 intact and the elongated member 85 may be diced into suitable lengths and electrically conductive straps may be soldered across the metal faces 95 and 97 of the bodies of P-type thermoelectric material and N-type thermoelectric material to provide a thermoelectric couple.

For a modification of the structure of FIGURES 2 and 4, reference should be had to FIGURES 11 and 12 showing a cylindrical annular compartmented member 100 comprising a hollow outer casing 101 fitted with a plurality of cylindrical concentric partitions 102, 104 and 106 and layers 107, 108 and 109 of thermoelectric material disposed in the spaces between the partitions. This modification employs thermoelectric materials in a manner similar in principle to that indicated with respect to FIGURE 6 in that the thickness and composition of the respective thermoelectric materials 107, 108 and 109 can be varied to provide highest efficiency during operation over a certain thermal gradient. The partitions may be cast or formed as a integral part of the original casing 101 or may be separate tubes inserted thereafter. As indicated by the drawing, the inner cylindrical partition 102 has a hollow 112. Nuclear and fissile material may be placed in hollow 112. Further, an innermost solid rod of uranium or an alloy thereof may be employed in place of hollow cylinder 112. Also, an inner bore may be machined in the solid rod after swaging. After out gassing, the member is sealed with a cap 110 and swaged.

FIGURE 12 is a cross-section of the thermoelectric element 100 with a fissile material core 113, and is indicative of the general arrangement of the final swaged element. After swaging, the thermoelectric material layers will be reduced in cross-section into a solid compacted body and forced into a firm and intimate contact with the surfaces of the reduced thickness of metal walls of the member. The fissile core material 113 is also rigidly consolidated. After swaging, the thermoelectric element without fissile material may be sectioned so that the thermoelectric material and partitions are exposed. These sections can be joined to other sections in producing thermoelectric devices.

Referring to FIGURE 13, a thermoelectric element 120 is shown after swaging and may be processed to produce thermoelectric couples. A metal jacket 121 contains a cylindrical member 122 comprising a swageable electrically and thermally insulating material, such as alumina, having circular bores 124 and 126 in which are disposed compacted P-type material in bore 124 and an N-type material in bore 126. The swaged element may be treated to remove jacket 121, then it is diced into desired lengths and an electrically conductive metal strap may be soldered across one end of each diced unit consisting of a P and an N-type material to provide a thermoelectric couple.

Referring to FIGURE 14, there is shown the operable portion of a relatively thin thermoelectric device produced by swaging. In this embodiment, a relatively thin tube of metal 132 having an electrically insulating coating 134 along its inner diameter, is filled alternately with pellets 136 of a P-type thermoelectric material, pellets 138, of an electrically and thermally conductive compactible metal (aluminum, for example) and pellets 140 of a compactible N-type thermoelectric material with pellets 142 of an electrical and thermal insulating material disposed between each of the pellets 136, 138 and 140, respectively. The unit is then swaged into a thin wire.

With reference to FIGURE 15, the swaged elongated wire-like unit of FIGURE 14 is bent at the ends to form a right angle at or adjacent the metal pellets 138 and the metal jacket removed along the sides of the thermoelectric pellets, so that there is produced a series of thermoelectric couples connected in series whereby electrical leads may be connected at each end of the device 130 for use as a thermoelectric generator or as a refrigerator.

Referring to FIGURE 16, there is shown a swaged thermoelectric nuclear fuel element 150 consisting of an outer cylindrical metal sheath 152 and an inner hollow cylindrical metal member 154. A thermoelectric material 156 is disposed in the annulus between the metal members 152 and 154 and a fissile material core 158 is disposed in the hollow member 154. Both materials are in firm and intimate contact with the metal walls thereof. An electrically insulating ring 160 is disposed at one end of the element and an electrically insulating spacer 162 is disposed at the other end to prevent electrical contact between the inner metal member and the outer metal sheath. A metal terminal 164 is welded to one end of the element to form the hot junction and a metal terminal 166 is welded to the other end to form the cold junction.

The metals used in forming the inner and outer members of a given unit are selected on the basis of their compatibility with the desired compactible material and the use to which the swaged unit will be placed. For example, when a compactible thermoelectric material is to be compressed, it is desirable to employ metal members comprising copper, aluminum, zirconium or iron or alloys thereof for the inner and outer metal members or casings since these metals provide good contacts for the thermoelectric material and are relatively good electrically and thermally conductive materials. If the swaged unit is to be employed as a consumable electrode and a compactible material comprising powdered or chipped zirconium is to be employed, another metal such as molybdenum will be employed for an inner and outer sheathing when the molybdenum may be desired for an alloying ingredient with zirconium. Also, a mixture of molybdenum and zirconium powders or other powders may be compacted between copper or other metallic cylinders and the cylinders may be removed and the compacted body employed as such.

The following examples are illustrative of the teachings of the invention.

*Example I*

A stainless steel cylinder 78 inches long and 2.5 inches in diameter, of a wall thickness of 0.035 inch is sealed at one end thereof and fitted with a central stainless steel tube of 1.73 inches outer diameter and a wall thickness of 0.035 inch. The inner annular space is filled with powdered sodium chloride. An end plug is welded to the rear end of the stainless steel cylinder. The resulting unit is swaged using the apparatus shown in FIGURE 1 to effect a 30% reduction of area of the annulus between the tubes. The final dimensions of the assembly are approximately 1.6 inches outer diameter, 1.058 inches inner diameter, and 143 inches in length, and the wall thickness of each tube is 0.029 inch.

*Example II*

A unit is prepared in the manner of Example I, the stainless steel tube having an outer diameter of 1.12 inches and a central tube having an inner diameter of 0.81 inch. The inner annular space is filled with powdered magnesium oxide. The unit is swaged so that the outer diameter of the stainless steel tube as reduced is 0.75 inch.

*Example III*

A unit is prepared in the manner of Example I, the outer diameter of the outer stainless steel tube being 1.187 inches and an inner diameter of 1.122 inches. A stainless steel rod is fitted in the stainless steel cylinder and the inner annular space is filled with powdered iron. The unit is swaged so that the outer diameter as reduced is 0.75 inch.

*Example IV*

A unit containing fissile material is prepared in the manner of Example I, using a stainless steel tube having an outer diameter of 1.19 inches and a central tube having an inner diameter of 0.81 inch. The ends of the tubes are prepared as shown in FIGURE 16 with insulated electrical terminals. The inner tube is filled with powdered uranium dioxide, while a suitable thermoelectric material is introduced into the annular space. The unit is swaged so that the outer diameter of the stainless steel tube as reduced is 0.75 inch. One set of tubes contains N-type thermoelectric material in the annular space while another set contains P-type material.

In a further modification of this Example IV, an iron clad copper tube filled uranium dioxide was disposed concentrically within a larger tube of aluminum and the annular space was filled with powdered N-type lead telluride doped with 0.1% bismuth, about the outer tube was spaced a thinner wall tube of aluminum and the latter annular space was filled with 200 mesh alumina powder. The ends were sealed and the assembly was swaged to a high density. In the final swaged unit, the uranium dioxide core was 0.400 inch in diameter, the outer diameter of the copper tube was .440 inch, the iron cladding diameter was 0.450 inch, the lead telluride was 0.610 inch in diameter, the innermost of the exterior aluminum tubes had an outside diameter of 0.670 inch and the inner diameter of the outermost tube was 0.720 inch while the outer diameter was 0.750 inch.

After swaging, the ends of the element were machined and electrical terminals were applied, with suitable insulation so that one was in contact only with the iron clad copper cylinder and the other terminal was in contact with the innermost aluminum cylinder, such that during use in a reactor where heat was generated by the uranium dioxide core, electrical current would flow between the concentric cylinders radially.

*Example V*

A unit is prepared as in Example II using aluminum tubing, the space between the tubes being filled with N-type lead telluride, and, after swaging the resulting highly compacted, elongated body is machined to cut off the sealed ends. The remainder of the tube is machined into short cylindrical pellets in each of which the compacted lead telluride is joined to the inner and outer aluminum cylindrical sections.

A similar swaged unit is prepared substituting P-type germanium telluride for the lead telluride, and similar short cylindrical pellets are prepared. A series of alternate germanium telluride and lead telluride pellets are joined into a long tubular structure following the technique disclosed in copending application of K. Katz et al., Serial No. 87,216, filed February 6, 1961 and now abandoned, whereby the inner tubes of every other pair of adjacent pellets are electrically joined to each other, while the outer tubes of each such joined pair are electrically connected to the adjacent pair, thereby producing a thermoelectric device. Passing a hot fluid such as water through the inner tube and cooling the outer tube of the device will cause an electrical potential to be produced between the extreme ends of the device.

*Example VI*

A unit is prepared as in Example II, using an aluminum cylindrical member of square cross-section, the cross-section being bisected by means of an alumina sheet, the space between one side of the sheet and the walls of the aluminum member being filled with N-type lead telluride and the space between the other side of the sheet and the metal member wall being filler with P-type germanium telluride. The unit is swaged and the resulting highly compacted elongated body is diced to provide a plurality of units. Opposite side sections of each unit disposed perpendicular to the alumina partition are machined off and a copper strap is joined across one end of the unit thereby connecting the P-type material to the N-type material to form a thermoelectric couple.

*Example VII*

A relatively thin tube of aluminum coated with an insulating material on its inner surfaces by anodization is filled with N-type germanium telluride pellets and P-type lead telluride pellets in the following manner: The lead telluride pellet is placed in the tube followed by a relatively thin wafer of beryllium; a compactible pellet of aluminum is then disposed in the tube followed by another relatively thin wafer of beryllium; finally, a germanium telluride pellet is disposed in the tube. The tube may be filled with any number of pellets in this arrangement depending on the length of the tube and the size of the finished product desired. The unit is then swaged and sintered and then deformed into a desirable shape, such as that shown in FIGURE 15.

*Example VIII*

A thermoelectric nuclear fuel element was prepared in the manner of Example I, using an aluminum outer tube coated on the inner surfaces thereof with alumina and an inner tube of iron. The inner tube was filled with powdered $Fe-UO_2$ while powdered lead telluride was introduced into the annular space. The unit was swaged so that the thermoelectric material was compacted to nearly 100% theoretical density. Wherein the final diameter of the outer aluminum tube was 0.840 inch and the inner iron tube was 0.400.

*Example IX*

A thermoelectric nuclear fuel element was prepared in the manner of Example I, using an aluminum outer tube coated on the inner surfaces thereof with alumina and an inner tube of iron. The inner tube was filled with powdered $Nb-UO_2$ while powdered lead telluride was introduced into the annular space. The unit was swaged so that the thermoelectric material was compacted to nearly 100% theoretical density, wherein the final diameter of the outer aluminum tube was 0.840 inch and the inner iron tube was 0.400.

*Example X*

A thermoelectric nuclear fuel element was prepared in the manner of Example I, using an aluminum outer tube coated on the inner surfaces thereof with alumina and an inner tube comprising concentrically bonded tubes of copper and iron, respectively. The inner tube was filled with powdered $BeO-UO_2$ while powdered lead telluride was introduced into the annular space. The unit was swaged so that the thermoelectric material was compacted to nearly 100% theoretical density, wherein the final diameter of the outer aluminum tube was 0.840 inch and inner iron tube was 0.400.

Similarly, other units may be prepared and swaged as described by substituting in the above examples zirconium, copper or iron or stainless steel or aluminum, and other compactible materials may be employed for the several compactible materials listed. Slight modifications may be followed in the initial unit to compensate for the different metal and design considerations.

A plurality of spaces may be present in each swaged unit, the spaces being filled with different compacted materials. Thus, three tubes of aluminum, for instance, of successively larger diameter are disposed concentrically to provide two annular spaces, and one space is filled with zinc antimonide and the other space is filled with germanium bismuth telluride. The resulting assembly is swaged to provide composite thermoelectric pellets in which zinc antimonide is in series with the germanium bismuth telluride. More than three tubes may be employed in a similar manner.

The tubes may be coated with a layer of a metal so as to improve the bonding with the compacted material. Thus, iron plating on copper tubes is desirable to enable less reaction taking place as compared to copper in contact with lead telluride, and other thermoelectric materials, during use of the thermoelectric devices so produced.

It should be understood that subsequent heat treating of the swaged thermoelectric element is required. This heat treating, to wit, sintering treatment is selected consistant with the sintering temperature and time of the thermoelectric material in order to achieve optimum thermoelectric properties.

While the invention has been described with reference to particular embodiments and examples, it will be understood, of course, that modifications, substitutions and the like may be made therein without departing from its scope.

I claim as my invention:

1. A process for forming a thermoelectric member comprising (1) providing a metal member having an internal elongated hollow space with at least two parallel side walls, (2) disposing at least one electrically conductive partition member parallel to the said parallel side walls in order to provide a plurality of compartments in the elongated hollow space, (3) introducing different thermoelectric materials into each of the said compartments, (4) sealing the ends of the hollow space in order to confine the thermoelectric materials, (5) swaging the sealed assembly in a direction parallel to the said parallel side walls whereby to provide an elongated flattened assembly wherein the thermoelectric material is compacted into a body in firm and intimate contact with the partition members and the metal member.

2. The method of claim 1 wherein the sides of the swaged assembly perpendicular to the flattened faces are removed to expose the thermoelectric material and partition members at such sides.

References Cited by the Examiner

UNITED STATES PATENTS

| | | | |
|---|---|---|---|
| 2,543,331 | 2/1951 | Okolicsanyi | 136—5.5 |
| 2,805,272 | 3/1957 | Postal | 136—4 |
| 2,811,569 | 10/1957 | Frederick et al. | 136—5 |
| 2,983,660 | 5/1961 | Loeb et al. | |
| 3,004,907 | 10/1961 | Precht et al. | |
| 3,051,767 | 8/1962 | Frederick et al. | 136—5 |
| 3,065,286 | 11/1962 | Connell | 136—4 |

FOREIGN PATENTS 841,608   7/1960   Great Britain.

OTHER REFERENCES

AEC Report DP–430, December 1959, pp. 3, 4, 10 and 14.

AEC Report HW–65359, March 1960, pp. 10–23.

AEC Report NAA–SR–4155, December 1959, pp. 8–14.

AEC Report ORNL 2865, November 1959, pp. 41–49.

Danko et al.: "Thermoelectric Nuclear Fuel Element. Annual Progress Report." April 15, 1959, WCAP–1162, pages 43–49.

Gardner, N. R.: "Coextruded Parts Can Simplify Design." In, "Materials in Design Engineering," volume 48, No. 7, December 1958, pages 91–93.

Holden, A. N.: "Metallurgy of Uranium," Addison-Wesley Pub. Co. Inc., Reading, Mass., C1958, pages 161 and 208–212.

Kilp et al.: (1) "Thermoelectric Nuclear Fuel Element. Third Quarterly Progress Report–Jan. 10, 1960." February 1960. WCAP–1376. Distribution to Depository Libraries March 23, 1960, pages 20–29.

Kilp et al.: (2) "Thermoelectric Nuclear Fuel Element, Quarterly Progress Report, April–June, 1960." July 10, 1960. WCAP–1956. Distribution to Depository Libraries September 30, 1960, pages 16–36.

Kilp et.: (3) "Thermoelectric Nuclear Fuel Element, Quarterly Progress Report, July–September 1960." October 10, 1960. WCAP–1647. Distribution to Depository Libraries February 17, 1961, pages 29–50.

Nuclear Metallurgy by Institute of Metals Division of AIME, vol. V, October 1958, pp. 1–12.

Reactor Core Materials, vol. 3, No. 3, August 1960, p. 52.

WINSTON A. DOUGLAS, *Primary Examiner.*

OSCAR R. VERTIZ, *Examiner.*

R. MACDONALD, A. M. BEKELMAN,
*Assistant Examiners.*